United States Patent [19]

Sie

[11] Patent Number: 4,892,373
[45] Date of Patent: Jan. 9, 1990

[54] SIGN BIT OPTICAL GEOPHONE
[75] Inventor: Swan A. Sie, Placentia, Calif.
[73] Assignee: Chevron Research Company, San Francisco, Calif.
[21] Appl. No.: 560,016
[22] Filed: Dec. 9, 1983
[51] Int. Cl.[4] ............... G02B 6/00; G02B 6/14
[52] U.S. Cl. ............... 350/96.10; 350/96.15
[58] Field of Search ............... 350/96.10, 96.15; 73/652, 653, 655

[56] References Cited
U.S. PATENT DOCUMENTS

| | | | |
|---|---|---|---|
| 2,343,063 | 2/1944 | Kent | 73/653 |
| 3,373,401 | 3/1968 | Bayer | 73/653 |
| 3,480,908 | 11/1989 | Codina | 73/653 |
| 3,856,127 | 12/1974 | Halfon et al. | 350/96.20 |
| 4,119,173 | 10/1978 | Sekhavat et al. | 73/653 |
| 4,185,503 | 1/1980 | Saito | 73/653 |
| 4,322,829 | 3/1982 | Davis et al. | 73/653 |
| 4,376,390 | 3/1983 | Rines | 73/653 |
| 4,379,226 | 4/1983 | Sichling et al. | 73/653 |
| 4,379,289 | 4/1983 | Peek | 350/96.20 |

Primary Examiner—William L. Sikes
Assistant Examiner—Robert E. Wise
Attorney, Agent, or Firm—E. A. Schaal; E. J. Keeling

[57] ABSTRACT

An optical binary signal geophone is described. The geophone utilizes an optical fiber for the transmission of light to the geophone. The geophone contains a light chopping means which oscillates in response to vibrations imparted into a geologic formation. As the chopping means such as a baffle or a tubular member vibrates, it chops the light signal and creates an on/off light pattern. The light passing through a slit in the baffle or tubular member is returned to the seismic vehicle for further processing. The optical geophone creates a binary signal directly without the use of clipping electronics and magnets or coils used in conventional geophones.

17 Claims, 1 Drawing Sheet

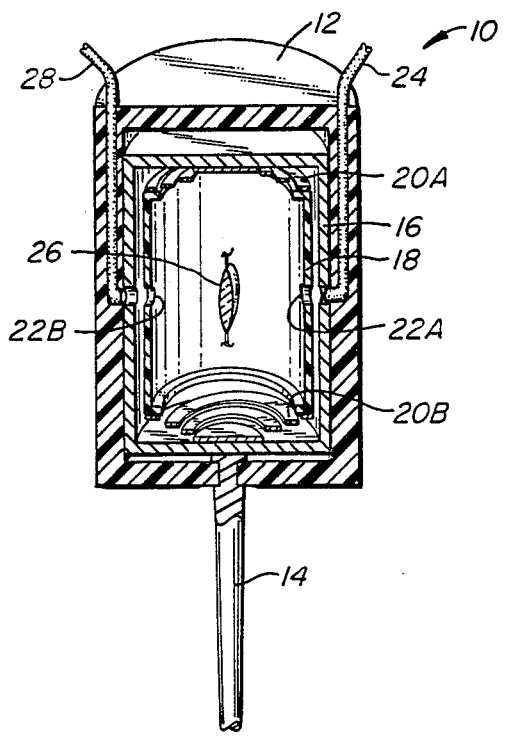
FIG._1.
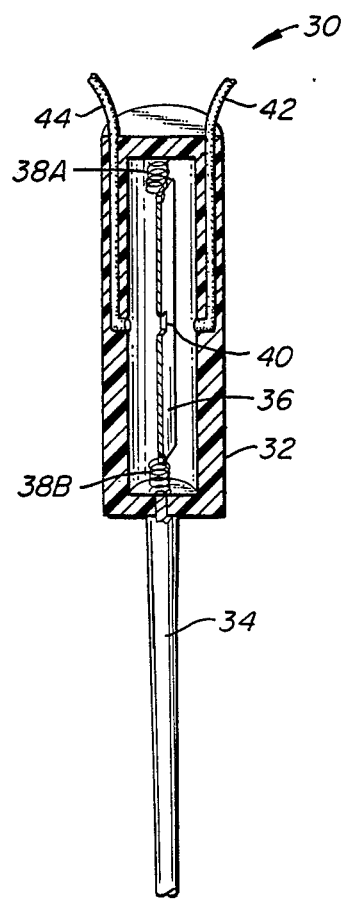
FIG._2.
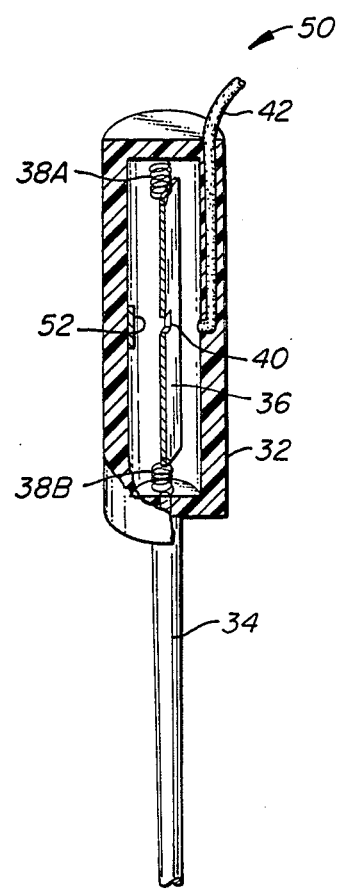
FIG._3.

SIGN BIT OPTICAL GEOPHONE

This invention relates to geophones. More specifically, this invention relates to optical geophones.

BACKGROUND OF THE INVENTION

Conventional geophones employ permanent magnets and electric coils suspended and dampened by springs or other means such as air, oil, and the like. The geophone is connected to a pair of wires. Thereafter, an explosion or other geologic moving event is created. The vibrations are picked up by the geophone which causes the coil to move. The movement of the coil in the magnetic field induces a change in voltage which is detected and recorded back at the seismic truck. If the voltage changes are desired in binary form, suitable processing electronics clip the voltage spikes to produce a binary signal. The accuracy of this signal is determined by the stability of the clipping electronics.

When conventional geophones are operated near sources of alternating currents such as high-tension lines, or other sources which produce or use alternating currents, the signals are effected in the 50Hz to 60Hz range by the stray electrical sources. Isolation of the geophones from these sources improves results but it is still impossible to eliminate their effect.

Therefore, it would be highly desirable to have a geophone which is not affected by voltage transmission interferences. It would also be desirable to have a geophone which initially produces a binary signal which does not require the use of magnets, coils and clipping electronics.

SUMMARY OF THE INVENTION

I have invented a geophone which generates a sign bit signal in response to geologic movement. Sign bit or binary signal is defined as a signal which is either on or off. More specifically, the geophone produces a binary signal in response to geological movement. The binary signal is created without the need of clipping electronics or the magnetics and coils found in conventional geophones. In addition, the geophone can operate in an environment containing stray electromagnetic radiation such as high-powered radio waves, or a AC power line transmissions.

The geophone operates by clipping a light signal from an LED or laser with a suitable light chopping means such as a mask or a slit in a tube or baffle. The geophone can be set up to function so that either the passage of light or the absence of light is the continuous signal. However, a continuous light signal is preferable because this permits the continuity of the system to be assured prior to the production of an explosion. The interference of the transmission of the light through an optical wave guide such as an optical fiber results in the generation of the "Off" portion of the binary signal.

Since the geophone need only be designed to create a light or no-light signal, the whole apparatus can be designed in a more compact package. This permits the seismic exploration truck to carry more geophones for more repetitive measurements. More geophones means the data base for predictions is larger and can be made with greater accuracy. In addition, the optical fibers require less space than conventional electric cables and, therefore, more cabling can be carried for a wider dispersion of geophones around a seismic station. Of course, conventional geophone packaging can be used if desired.

Other advantages of the invention will be evident from the following detailed description when read in conjunction with the accompanied drawings.

BRIEF DESCRIPTION OF THE DRAWINGS

FIG. 1 illustrates a sign-bit optical geophone in a conventional case.

FIG. 2 illustrates a slim-line sign-bit optical geophone.

FIG. 3 illustrates a slim-line sign-bit optical geophone using a single optical fiber.

DETAILED DESCRIPTION OF THE INVENTION

The invention will be more clearly illustrated by referring to the drawings. FIG. 1 illustrates a signbit optical geophone 10 in the conventional case 12. The case 12 is attached to a long spike 14 for implanting it into the ground or any other means for coupling the geophone to the ground such as a flat pedestal, and the like. The case 12 contains an inner case 16 which houses a tubular shaped member 18 suspended within case 16 by springs 20a and 20b. The inner case 16 contains a suitable dampening medium such as air, oil, and the like. In a conventional geophone, the tubular member 18 would contain wire windings to form a coil. However, since no coil is needed in the optical geophone 10, the tube 18 is fabricated from plastic or other suitable material. The cylinder 18 contains slits 22a and 22b. The tube 18 and slits 22a and 22b function as the light chopping means. The length of the slit is designed to be at least equal to or longer than about one-half of the expected total amplitude, i.e., up and down movement of the cylinder containing the slits. The motion of the cylinder is a function of its mass and the spring strength. Furthermore, the slit is positioned so that either the up movement or the down movement passes light while a movement in the other direction passes no light. The width need only be large enough to permit enough light to pass for focusing onto a return fiber 28. The more light the stronger the signal.

A fiber 24 is connected to an input side of the case 16. The fiber 24 is connected so that, when the geophone is at rest, the light can shine through the slits 22a and 22b to an output fiber 28 affixed opposite side of the case 16 to the input fiber 24. The tubular member 18 further contains a means for focusing 26 the light emitted from the fiber 24 such as a suitable lensing system of a lens or lenses. This focuses the light emitted from the fiber 24 which passes through the slit 22a onto the receiving end of the fiber 28 through slit 22b. Since the optical geophone 10 does not require any coil or magnet, the parts need not be constructed of special metals. However, the springs must be constructed of materials which give a uniform response. In this embodiment, conventional geophone springs can be used. Preferably, the geophone 10 would be constructed of light-weight durable plastics.

The geophone 10 operates by injecting light from an LED or other suitable light source such as a laser, for example, a gallium arsenide laser, into the end of the fiber 24. The laser light propagates through the fiber 24, the slit 22a, the focusing means 26, and back into the fiber 28 which returns to the processing hardware. If optical processing is used, the signal from the fiber 28 can be processed directly. However, if conventional signal processing is used, then the light from the fiber 28 must impinge on a suitable transducer, such as a photodiode, to convert the optical signal into an electrical signal for conventional processing.

The use of light as the signal means with the chopping means to generate the binary signal permits the fabrication of slim-line optical geophones. FIG. 2 illustrates a preferred slim-line optical geophone 30. The geophone 30 contains a case 32 which incorporates a means for communicating the geophone with the ground such as a spike 34. Within the case 32 is a baffle 36 suspended by springs 38a and 38b. The baffle 36 contains a slit 40. Optionally, and not illustrated, the slit can contain a means for focusing light such as a lens to enhance the transfer of light from the fibers 42 to 44. The fibers 42 and 44 are affixed to the case 32 such that a continuous stream of light passes through slit 40 when geophone 30 is at rest. Preferably, the case 32 is as narrow as possible to limit the loss of light outside the fibers 42 and 44. During the operation of the geophone 30, the baffle 36 moves up and down as a chopping means to chop the transfer of the light from the fibers 42 and 44. This chopping creates the binary signal. As described for the geophone 10 in FIG. 1, the light is injected into the optical fiber 42 and returns for processing through the optical fiber 44. Since the optical geophone 30 does not require magnet or coil, the optimum configuration would be in a thin square or rectangular configuration. As described with respect to geophone 10, the slit 40 can be configured to generate any desired sign bit signal.

FIG. 3 refers to another alternative embodiment of the invention. A geophone 50 is illustrated which contains all the parts of the geophone 30 with the exception of the return optical fiber 44. On the opposite side of the case 32 in place of the fiber 44 is a reflecting mirror 52 to reflect the light from fiber 42 back into fiber 42 for return to the seismic recording/processing vehicle. The reflecting mirror 52 incorporates suitable means to alter the polarization of the light reflected therefrom by 90° so that it can be discerned from the injected light into the fiber 42. A suitable polarizer would be a quarter-wave plate fabricated from a suitable material such as tourmaline or a dichroic crystal, and the like. In addition, the fiber 42 must be light polarization maintaining so that the outgoing signal can be differentiated from the incoming signal. The fiber can be single or multi-mode light polarization maintaining. Other polarizers can be used, such as soleil compensators and suitable dichroic crystals, such as tourmaline, calcite, and the like, and other suitable optical rotators.

As the length of the fiber increases between the geophones and the seismic vehicle, optical amplifiers can be used in the light returning fiber to enhance the signal received at the seismic vehicle.

The system as described requires each geophone to be connected directly to the seismic vehicle. If desired, the original emitted optical signal can be received on the opposite side of the baffle through the slit by a suitable photodiode which will convert the light to a binary electrical signal. This can either be transferred back to the seismic vehicle by suitable electrical cables or used to drive an LED for injecting light back into a fiber in an on/off fashion, i.e., the pulses of electricity from the photodiode would be used to drive an LED to create pulses of light for return to the seismic vehicle through an optical fiber. This is an alternative method of amplifying the light signal.

Having described the invention with reference to particularly preferred embodiments thereof, it should be understood that modifications that would be obvious to one of ordinary skill in the seismic arts are contemplated to be within the scope of the invention.

What is claimed is:

1. An optical geophone comprising:
   optical fiber means for transmitting an optical signal to a geophone case;
   light chopping means located within said case, said light chopping means
   positioned so that either the movement up or down along its vertical axis of movement passes or blocks light while a movement in the opposite direction along the vertical axis blocks or passes light, said light chopping means configured to be at least equal to or longer than about one-half of the expected total amplitude of the up and down movement along the vertical axis;
   oscillating means connected to said chopping means, said oscillating means capable of oscillating said chopping means along said chopping means vertical axis in response to geological movement thereby creating a
   binary signal of either light or no-light; and
   signal return directing means for returning the chopped light signal to the seismic vehicle.

2. The apparatus according to claim 1 wherein the signal return means is an optical fiber.

3. The apparatus according to claim 2 wherein said chopping means is a tubular member having two slits in the same plane or a baffle containing a slit.

4. The apparatus according to claim 3 wherein the chopping means is a baffle containing a slit.

5. The apparatus according to claim 2 wherein the chopping means further contains focusing means for increasing the angle of acceptance of the optical fiber for return signals.

6. The optical geophone according to claim 5 wherein said return means is the optical fiber transmitting means and the apparatus further includes a mirror and polarizer capable of reflecting the chopped signal back into the optical fiber transmitting means, said optical fiber is light polarization maintaining.

7. The apparatus according to claim 6 further comprising at least one optical amplifier along the signal return directing means to enhance the binary signal.

8. The apparatus according to claim 7 wherein the chopping means is dampened.

9. The apparatus according to claim 1 wherein a chopped light signal impinges on a photodiode and a binary electrical signal is returned to the seismic vehicle.

10. The process according to claim 9 wherein the binary electrical signal is directed to an LED to generate a binary light signal which is returned to the seismic vehicle through an optical fiber.

11. The apparatus according to claim 10 further comprising at least one optical amplifier along the signal return means to enhance the binary signal.

12. The apparatus according to claim 11 wherein said chopping means is dampened.

13. A process of generating a binary signal representative of the movement of a geological formation comprising:
   directing a beam of light from a seismic vehicle toward a slit, said slit positioned so that either the movement up or down of the slit along its vertical axis of movement passes or blocks light while a movement in the opposite direction along the vertical axis blocks or passes light, said slit configured to be at least equal to or longer than about one-half of the expected total amplitude of the up and down movement along the vertical axis;

chopping the beam of light by permitting the slit to oscillate along its vertical axis in response to geological movement thereby creating a binary signal of either light or no-light; and directing said chopped light signal back to the seismic vehicle.

14. The process according to claim 13 further comprising amplifying the light signal after chopping.

15. The process according to claim 14 wherein the chopped light is converted into a binary electrical signal.

16. The process according to claim 15 further comprising converting said binary electrical signal into a binary optical signal.

17. The process according to claim 16 further comprising optically processing said binary signal.

* * * * *